(12) United States Patent
Simmons et al.

(10) Patent No.: US 6,505,364 B2
(45) Date of Patent: Jan. 14, 2003

(54) METHOD AND APPARATUS FOR COVERING AN ADJUSTABLE PATIENT TABLE

(75) Inventors: John Matthew Simmons, West Jordan, UT (US); Lonnie B. Weston, Clearfield, UT (US); Paul A. Jacob, Sandy, UT (US); Jeffrey W. Pattee, Salt Lake City, UT (US); David M. Robbins, Sandy, UT (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 127 days.

(21) Appl. No.: 09/681,383

(22) Filed: Mar. 27, 2001

(65) Prior Publication Data

US 2002/0138903 A1 Oct. 3, 2002

(51) Int. Cl.[7] .............................................. A47B 71/00
(52) U.S. Cl. ................................ 5/600; 5/611; 108/150
(58) Field of Search ........................ 5/600, 611; 108/6, 108/150

(56) References Cited

U.S. PATENT DOCUMENTS

| | | | | | |
|---|---|---|---|---|---|
| 4,195,829 A | * | 4/1980 | Reser | ............................ | 5/607 |
| 5,013,018 A | * | 5/1991 | Sicek et al. | .................. | 378/209 |
| 5,237,600 A | * | 8/1993 | Kamata | ....................... | 378/177 |
| 5,398,356 A | * | 3/1995 | Pfleger | ............................ | 5/601 |
| 5,528,782 A | * | 6/1996 | Pfeuffer et al. | .............. | 108/147 |
| 5,621,933 A | * | 4/1997 | Knapp et al. | ................... | 5/607 |
| 6,038,718 A | * | 3/2000 | Pennington et al. | ........... | 5/608 |
| 6,295,671 B1 | * | 10/2001 | Reesby et al. | .................. | 5/600 |

OTHER PUBLICATIONS

V.A.C.S. Tables brochure.
Advanced Positioning System brochure.
Biodex Medical brochure.
Morgan MEDesign, Inc. brochure.

* cited by examiner

*Primary Examiner*—Lynne H. Browne
*Assistant Examiner*—James M. Hewitt
(74) *Attorney, Agent, or Firm*—McAndrews, Held & Malloy, Ltd.; Peter J. Vogel; Michael A. Dellapenna (57) ABSTRACT

A patient table, which is movable in at least one of a vertical direction and a tiltable direction. The patient table comprises: a base; a patient support surface; a support mechanism connected to the base and the support mechanism moving the patient support surface in at least one of a vertical direction and a tiltable direction; and a telescopic cover enclosing the support mechanism, the telescopic cover expanding and constructing with movement of the support mechanism.

14 Claims, 6 Drawing Sheets

METHOD AND APPARATUS FOR COVERING AN ADJUSTABLE PATIENT TABLE

BACKGROUND OF INVENTION

The preferred embodiments of the present invention generally relate to an adjustable patient table for supporting patients during medical procedures. More particularly, the preferred embodiments of the present invention relate to a telescoping cover that encloses the moving parts of the table while affording a full range of motion to the medical patient support system.

Adjustable patient tables exist in a wide range of medical patient support systems for medical applications, each designed to be used for specific medical procedures. The medical patient support system typically includes two or three essential components, namely a patient support surface that is attached to a support apparatus and an adjustable mechanism that moves the patient table in various directions, including up and down and/or side to side. The adjustable mechanism may be manually operated or may be power assisted. The ability to position patients quickly and accurately during medical procedures is important to clinicians, because stopping a procedure to reposition a patient can be time consuming and sometimes even dangerous.

Conventional medical patient support systems typically provide two degrees of freedom corresponding to lateral roll and tilt. The adjustable mechanism usually includes moving parts that may be dangerous if exposed. There is a need therefore for a system that covers the adjustable mechanism. Additionally, a need has existed for a cover system that does not restrict the patient support system's operation. A need has also existed for a cover system that is safe, is easy to clean, and is aesthetically acceptable.

Although cover systems have been provided for covering the adjustable mechanism of medical support systems, such cover systems do so at the expense of safety, cleanability and aesthetics. For example, one cover system has been proposed that uses bellows to cover the entire adjustable mechanism. A bellows design, however, is very difficult to clean because it does not provide hard, flat surfaces. A bellows design is also aesthetically unacceptable. Another system has been proposed that uses sheet metal covers that move with the adjustable mechanism. A sheet metal design, however, is unsafe because the metal covers could potentially pinch the patient or care taker's skin in between the metal covers when the system is moving. A sheet metal system is also aesthetically unacceptable.

A need, therefore, exists for an improved medical patient support system that provides a patient table permitting a full range of motion of the patient table while enclosing the adjustable mechanism in a safe, easy to clean and aesthetically acceptable way.

SUMMARY OF THE INVENTION

In accordance with at least one preferred embodiment of the present invention, a medical patient support system is provided comprising a patient support surface, a support mechanism, a base and a cover system for enclosing the support mechanism. The cover system includes telescoping cover panels. The cover system encloses the support mechanism as the support mechanism moves the patient table up and down and tiltably left or right.

One aspect of a preferred embodiment of the present invention is the use of spring loaded telescoping rods to achieve the desired movement of the cover panels. Another aspect of a preferred embodiment of the present invention includes stop limits on the telescoping rods.

One aspect of a preferred embodiment of the present invention is the use of cover panels having flat rectangular surfaces. Another aspect of a preferred embodiment of the present invention includes a smooth material on the inside of the cover panel.

These and other features of the preferred embodiment are discussed or will become apparent in the following detailed description of the preferred embodiments of the present invention.

BRIEF DESCRIPTION OF DRAWINGS

The foregoing summary, as well as the following detailed description of the preferred embodiments of the present invention, will be better understood when read in conjunction with the appended drawings. For the purpose of illustrating the preferred embodiments of the present invention, there is shown in the drawings, embodiments which are presently preferred. It should be understood, however, that the present invention is not limited to the arrangements and instrumentality shown in the attached drawings.

DETAILED DESCRIPTION

Figure 1:
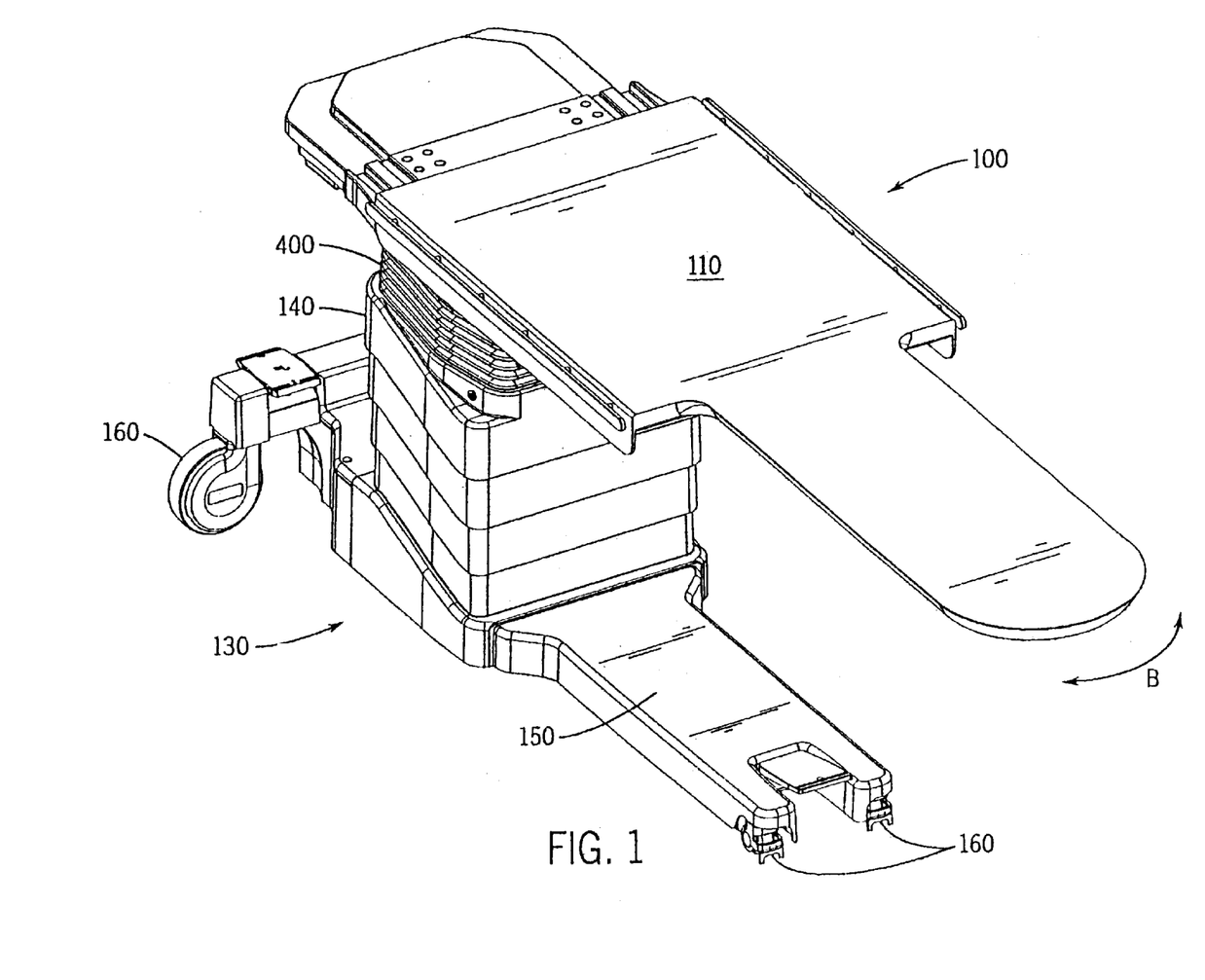
FIG. 1 illustrates a patient support system employing the cover system according to a preferred embodiment of the present invention.
Figures 8, 9:
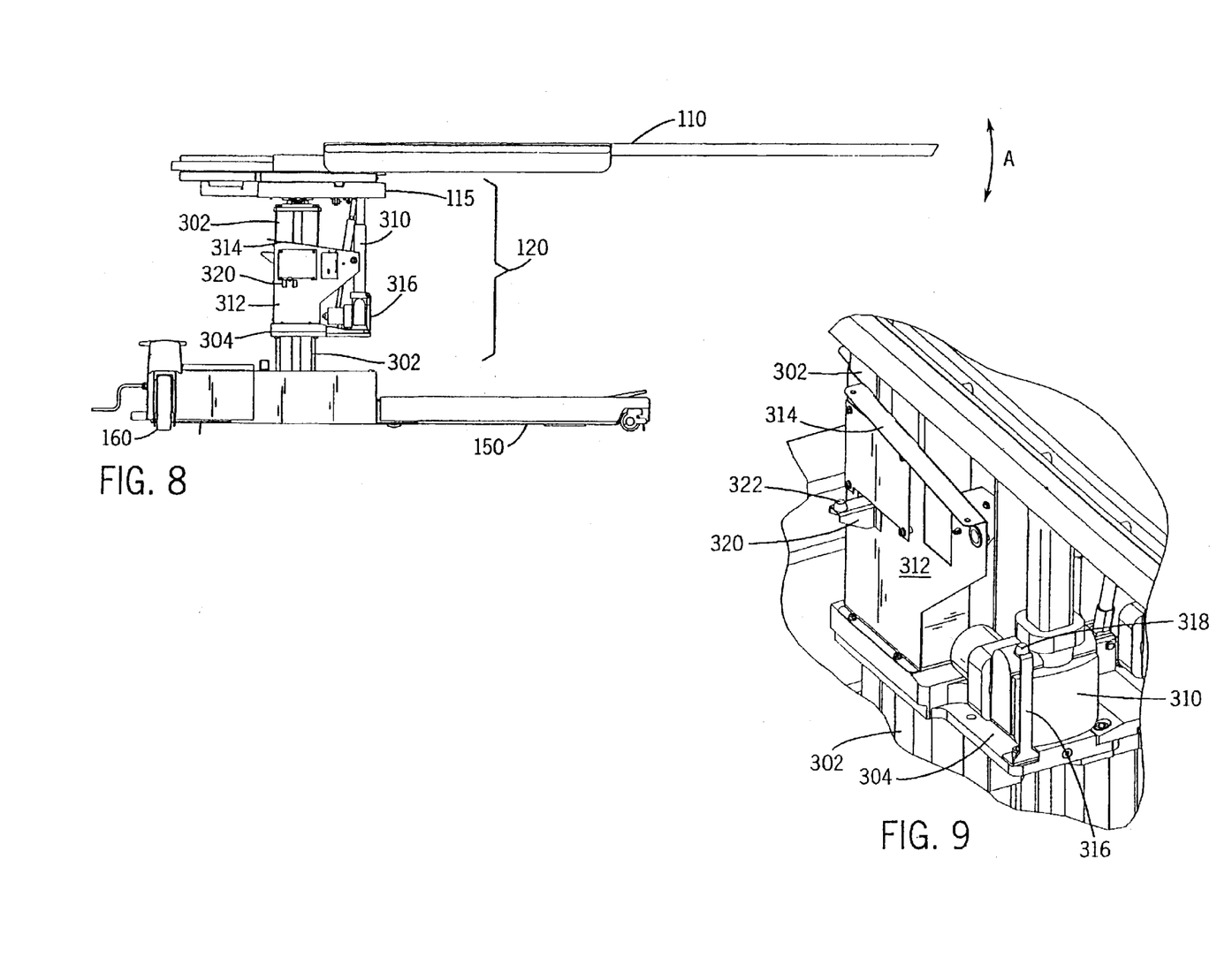
FIG. 8 illustrates a patient support system with a patient table, adjustable mechanism and base according to a preferred embodiment of the present invention.
FIG. 9 illustrates a bracket and arms for supporting cover panels according to a preferred embodiment of the present invention.

FIG. 1 and FIG. 8 illustrate a patient support system 100 with a telescoping cover 140 according to a preferred embodiment of the present invention. The patient support system 100 includes a patient support surface 110 provided on a support apparatus 115, an adjustable mechanism 120, a base 130, and a cover system 140 enclosing the adjustable mechanism 120. The base 130 includes a support structure 150, which supports the patient support system, and may include wheels 160 to allow the support patient support system to be moved. The adjustable mechanism 120 is attached to and supported by the base 130. The adjustable mechanism 120 can move the patient support surface 110 up and down and tilt the patient support surface left or right.

The adjustable mechanism 120 includes lift columns 302, as shown in FIG. 8, that can raise or lower the patient support surface 110. The adjustable mechanism 120 includes lift actuators 310 as shown in FIG. 8, that can tilt and/or roll the patient support surface 110. The patient support surface 110 is attached to and supported by the adjustable mechanism 120. The cover system 140 encloses the adjustable mechanism 120.

Figure 2:
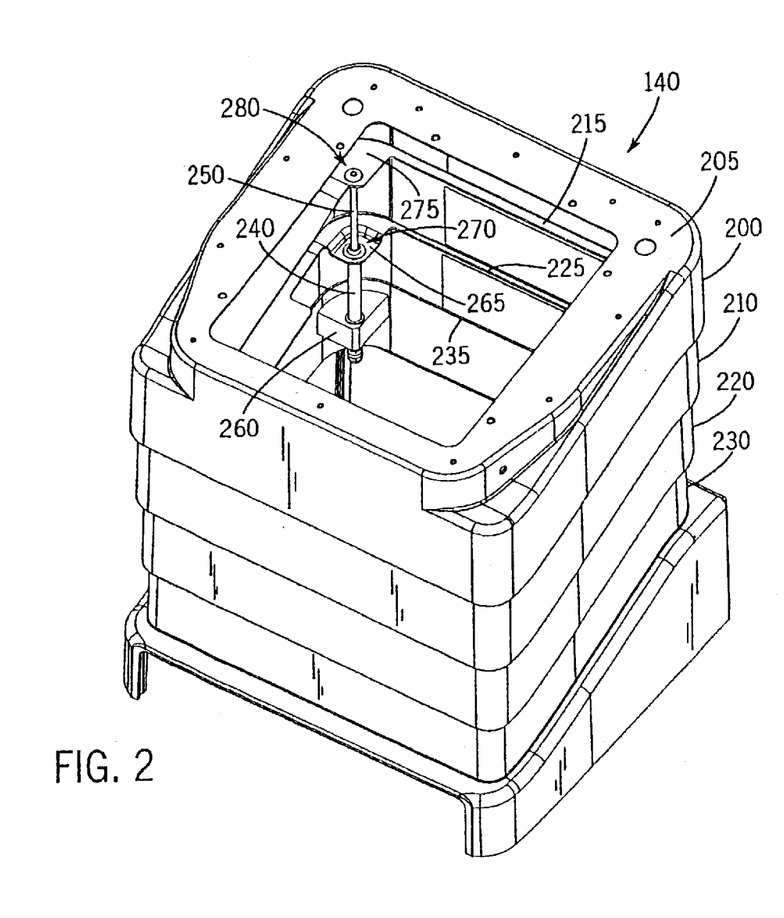
FIG. 2 illustrates a cover system according to a preferred embodiment of the present invention.

FIG. 2 illustrates a top isometric view of an exemplary cover system 140 that is formed in a telescoping configuration. The cover system 140 includes four cover panels, namely a top cover panel 200, an upper intermediate cover panel 210, a lower intermediate cover panel 220 and a base cover panel 230. The cover panels 200, 210, 220 and 230 are formed as rectangular shells with flat sides, each shell has an inner dimension that is greater than an outer peripheral dimension of the next lower shell. Optionally, the cover panels 200, 210, 220 and 230 may be a different shape such as circular, triangular, oval, octagonal and the like depending in part on the shape of the underlying structure to be covered. Hence, the outer peripheral dimension of cover panel 230 is smaller than, and slidably receivable within, the interior dimension of cover panel 220. Similarly, the outer peripheral dimension of cover panel 220 is smaller than, and slidably receivable within, the interior dimension of cover panel 210. The outer peripheral dimension of cover panel 210 is smaller than, and slidably receivable within, the interior dimension of cover panel 200.

In a preferred embodiment, cover panels 210, 220 and 230 are slidably connected by lower and upper telescoping rods 240, 250 which are mounted at interior corners of cover panels 210, 220 and 230. Optionally, the telescoping rods 240, 250 may be located at less than all four corners, such as at three corners, or two opposed corners, and the like. Each corner panel 200, 210, 220, 230 includes a shelf 205, 215, 225 and 235, respectively, around the upper rim to prevent the cover panels 200, 210, 220, 230 from collapsing onto one another beyond a maximum desired amount.

Lower ends of the lower telescoping rods 240 are slidably received in blocks 260 at the interior corners of the base cover panel 230 and upper ends of the lower telescoping rods 240 are mounted to brackets 265 secured to the interior corners of the lower intermediate cover panel 220. The lower telescoping rods 240 are attached to the bracket 265 at position 270. The upper end of the upper telescopic rods 250 are mounted to brackets 275 secured to the interior corners of the upper cover panel 230. The upper telescoping rods 250 are attached to the brackets 275 at position 280 and the lower end of the upper telescoping rods 250 are slidably received through the lower telescoping rods 240. In another preferred embodiment the telescoping rods 240, 250 are attached to the cover panels 210, 220 by snapping into grooves in shelves 215, 225.

Figure 3:
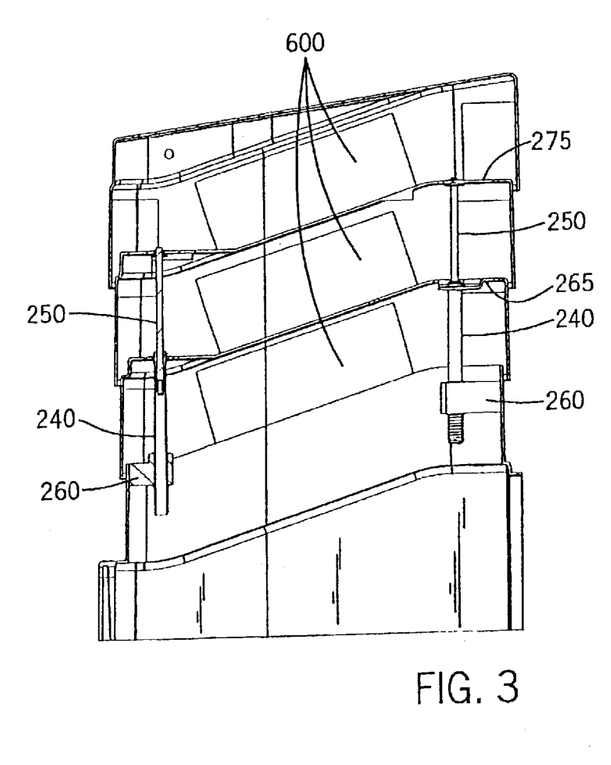
FIG. 3 illustrates a sectional side view of a cover system according to a preferred embodiment of the present invention.
Figure 4:
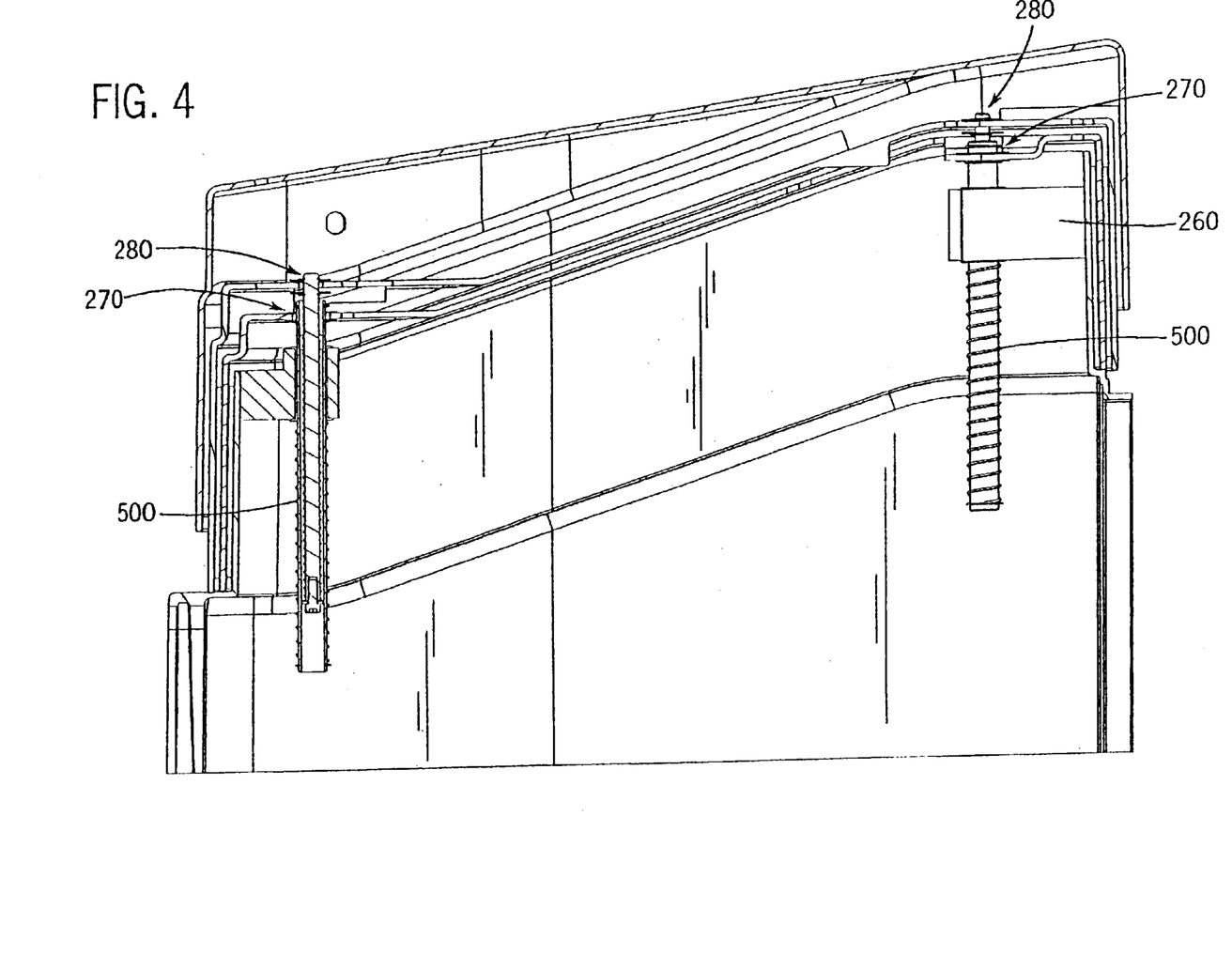
FIG. 4 illustrates a sectional side view of a cover system according to a preferred embodiment of the present invention when the system is fully collapsed.
Figure 5:
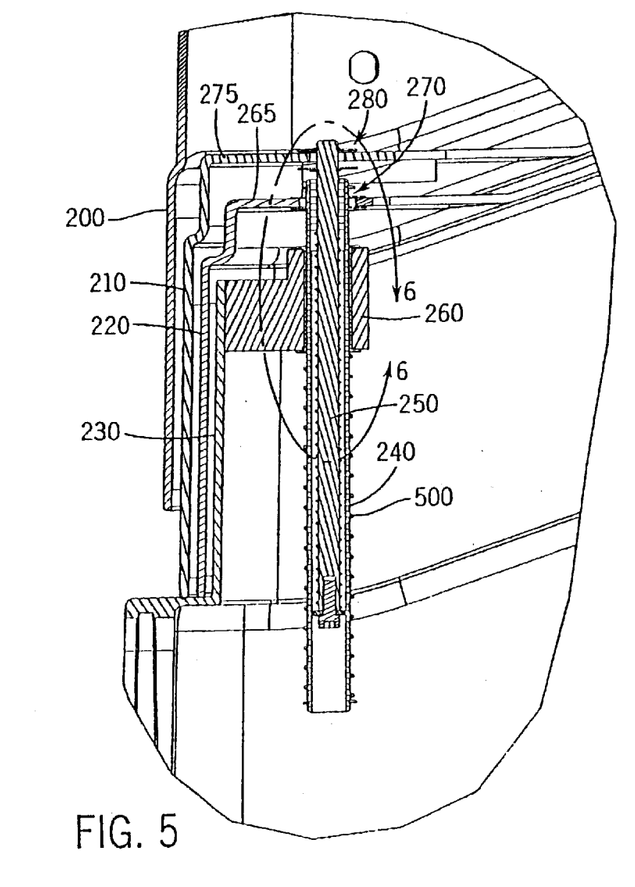
FIGS. 5 and 6 illustrate sectional views of a spring loaded telescoping rod according to a preferred embodiment of the present invention.
Figure 7:
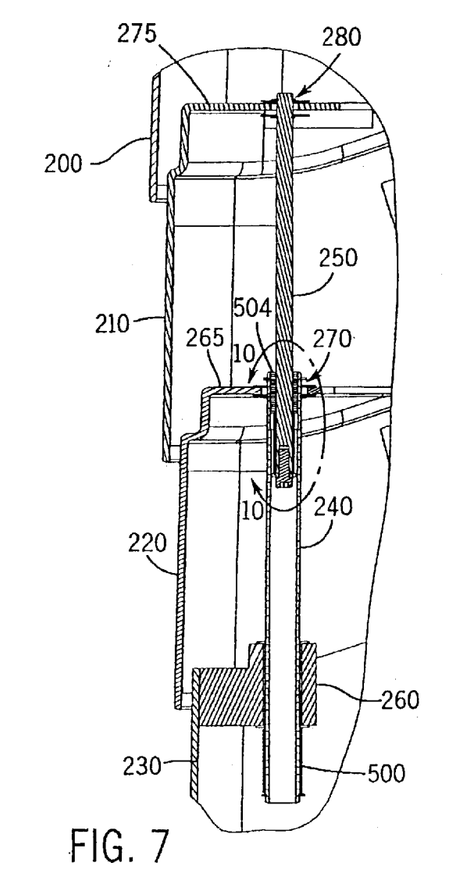
FIG. 7 illustrates a sectional view of a telescoping rod according to a preferred embodiment of the present invention when the system is fully extended.
Figure 10:
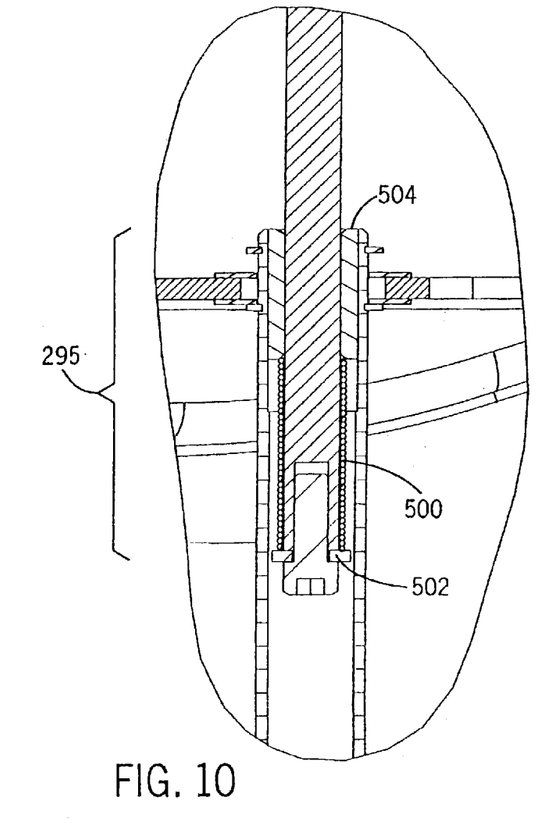
FIG. 10 illustrates a sectional view of a spring loaded telescoping rod according to a preferred embodiment of the present invention.

The telescoping rods 240, 250 have stop limits 295 that determine the distance cover panels 210, 220 and 230 can be raised. The stop limits 295 may be a flared rib or a flange around the exterior of the bottom end of the telescoping rods 240, 250. The stop limit 295 engages a bushing or guide portion 504 formed on an upper end in the interior of the channel through the lower telescoping rod 240. In a preferred embodiment of the present invention, as shown in FIG. 10, the springs 500 may act as the stop limits. In the alternative embodiment of FIG. 10, the spring 500 is held on the lower end of the upper telescoping rod 250 by a flange 502. The upper end of the spring 500 engages a bushing 504 located on the interior of the upper end of the lower telescoping rod 240. As the upper and lower telescoping rods 250 and 240 are fully extended the springs 500 compresses gradually, thereby providing a gradual stop to the telescoping motion. FIGS. 3 and 7 illustrate the upper and lower telescoping rods 250 and 240 fully extended. FIGS. 4 and 5 illustrate the upper telescoping rod 250 and lower telescoping rod 240 fully collapsed.

FIGS. 8 and 9 illustrate the adjustable mechanism 120 in more detail. The adjustable mechanism 120 includes lift columns 302 securely mounted on the support structure 150 and extending upward therefrom. A platform 304 is mounted to the lift columns 302. Multiple lifting actuators 310 are attached to the platform 304. The primary lifting columns 302 move the patient support surface 110 upward and downward as the primary lifting columns 302 expand and contract. Lifting actuators 310 are mounted to the platform 304. The lifting actuators 310 may be configured in a pair arranged side beside relative to the support apparatus 115. When the lifting actuators 310 are moved together in the same direction, the patient support surface 110 is tilted upward and downward along the direction of arrow A (FIG. 8). When the lifting actuators 310 are moved in different directions (or one of the lifting actuators 310 is maintained stationary while expanding or contracting the other of the lifting actuators 310), the patient support surface 110 is rolled from side to side along the direction of arrow B (FIG. 1).

Side brackets 312 are provided on either side of the adjustable mechanism 120 and mounted to the platform 304. The side brackets extend upward along either side of the primary lifting columns 302. Upper ends of the side brackets 312 include support flanges 314 flared outward and extending along a length of the side brackets 312. The support flanges 314 are configured to rest under and be secured to opposite sides of the shelf 205.

The platform 304 further includes front arms 316 located at the front opposed corners of the platform 304. The front arms 316 extend upward and include pads 318 on the upper ends thereof. The pads 318 are received under the shelf 215 on the upper intermediate cover panel 210. Projections 320 are located near the rear end of the side brackets 312 and extend outward from the side brackets 312. The projections 320 include pads 322 extending upward therefrom. The pads 322 also are aligned to be received under and engage the shelf 215 on the upper intermediate cover panel 210. Optionally, pins may be used instead of pads 318, 322 and shelf 215 may include holes that align with the pins. When the lifting columns 302 are extended, the platform 304 and thus the arms 316 and the projections 320 are lifted. As the arms 316 and projections 320 raise, the pads 318 and 322 engage the shelf 215 and begin to lift the upper intermediate cover panel 210.

In operation, movement of the adjustable mechanism 120 causes the top cover panel 200 to move. Movement of the adjustable mechanism 120 also will move the upper intermediate cover panel 210 by the arms 316 and projections 320 attached to the adjustable mechanism 120. The arms 316 and projections 320 are positioned to engage and begin raising the upper intermediate cover panel 210 when the bottom of the top cover panel 200 meets the top of the upper intermediate cover panel 210. As the upper intermediate cover panel 210 moves vertically, the upper telescoping rods 250 also move vertically. The upper telescoping rods 250 include stop limits 295 that stop the rods 250 from extending past a certain height. When the upper telescoping rods 250 reach the fully extended position, the upper telescoping rods 250 pull the lower intermediate cover panel 220 vertically as the lower telescopic rods 240 begin to be raised. The lower telescoping rods 240 also include stop limits 295 that prevent extension past a certain height. The stop limits 295 prevent cover panels 210 and 220 from being overly lifted and therefore exposing the adjustable mechanism 120.

In the preferred embodiment, bellows 400 are connected between the bottom of the patient support surface 110 and the top of the top cover panel 200. The bellows 400 are flexed as the support apparatus 15 is tilted or rolled front to back or side to side.

Figure 6:
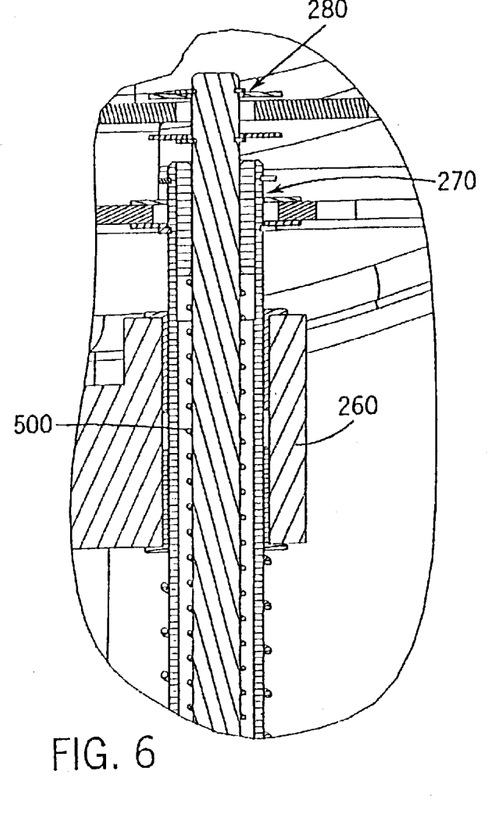

In one preferred embodiment, the telescoping rods 240, 250 are spring 500 loaded. FIGS. 5 and 6 illustrate spring 500 loaded telescoping rods 240, 250. As the adjustable mechanism 120 moves down vertically, the spring 500 loaded telescoping rods 240, 250 move the cover panels 210, 220 down. The springs 500 impart a negative force on the cover panels.

The height of the cover panels 200, 210, 220, 230 is determined by the range of motion and distance required by the adjustable mechanism 120. The required range of motion may also determine the number of cover panels 200, 210, 220, 230.

In the one embodiment, a smooth material is placed on the inside walls of the cover panels 200, 210, 220 to prevent scraping and rubbing. This material may be a polyethylene tape which is commercially available.

Alternatively, the embodiments are not limited to four cover panels 200, 210, 220, 230. Instead, fewer or more cover panels 200, 210, 220, 230 may be employed. For example, three cover panels 200, 210, 230 may be employed. In such a system, the top cover panel 200 may be attached to the adjustable mechanism 120 by brackets 312. The intermediate cover panel 210 may be supported by front arms 316 and rear projections 320 attached to the adjustable mechanism 120. In such a system there may be none or only one set of telescopic rods 250.

Alternatively, the preferred embodiments are not limited to attaching the top cover panel 200 to brackets 312 and the upper intermediate cover 210 to front arms 316 and rear projections 320. Instead, the front arms 316 and rear projections 320 could be removed and additional telescopic rods 240, 250 added to the top cover panel 200. In such a system, the adjustable mechanism 120 would raise the top cover panel 200. The upper intermediate cover panel 210 and the lower intermediate cover panel 220 would then be raised by the telescoping rods as described herein.

Referring again to FIG. 1, in operation, a patient may be positioned on the patient support surface 110. Then, the adjustable mechanism 120 may raise the patient support surface 110 to position the patient at the proper height. As the adjustable mechanism 120 raises the patient support surface 110 the top cover panel 200 is raised. As the adjustable mechanism 120 raises the patient support surface 110 to where the top cover panel 200 meets the top of the upper intermediate cover panel 210 the arms 316 and rear projections 320 begin to raise the upper intermediate cover panel 210. As the adjustable mechanism 120 raises the patient support surface 110 past the upper intermediate telescopic rods' 250 stop limit, the lower intermediate cover 220 is raised by the upper intermediate telescopic rods 250. The adjustable mechanism 120 may continue to raise the patient support surface until the lower intermediate telescopic rods 240 reach their stop limit.

To retract or lower the patient, the adjustable mechanism 120 lowers the patient support surface 110. As the adjustable mechanism 120 lowers the patient support surface 110, the cover panels 200 and 210 are retracted by the spring loaded telescopic rods 240, 250. The adjustable mechanism 120 may lower the patient support surface 110 until the top cover panel 200 is fully collapsed over the other cover panels 210, 220, 230. FIG. 4 illustrates the cover panels 200, 210, 220, 230 in a fully collapsed position. The covering system of the preferred embodiment retracts to a low height because the cover panels 200, 210, 220, 230 overlap one another.

The preferred embodiment of the present invention provides an adjustable patient support system with an enclosed adjustable mechanism 120 that is safer, easier to clean and aesthetically superior to the prior art. The covering system 140 is safer than the prior art because the telescopic cover panels 200, 210, 220, 230 do not have any pinch points that could injure patients or care takers. The covering system 140 also prevents gaps between cover panels 200, 210, 220, 230 by including telescopic rods 240, 250 with stop limits and that are spring 500 loaded. The cover system 140 provides hard, flat surfaces that can all be exposed and therefore can be easily cleaned by conventional methods. The covering system 140 is also aesthetically acceptable because it can be painted to match the patient support system.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An apparatus for encasing a support mechanism of a patient table having a base and a patient support surface that is movable in at least one of a vertical direction and a tiltable direction, said apparatus comprising:

the support mechanism, connected to the base and the patient support surface; and a telescopic cover mounted to said support mechanism and configured with shells that expand and contract with the movement of said support mechanism, wherein said telescopic cover includes a plurality of brackets mounted in corners of said shells, said brackets slidably receiving telescopic rods, said telescopic rods lifting at least one lower shell as an upper shell raises the telescopic rods.

2. The apparatus of claim 1, wherein said shells further comprise rigid cover panels that overlap one another.

3. The apparatus of claim 2, wherein said telescopic rods further comprise means for inducing a negative force on the cover panels.

4. The apparatus of claim 2, wherein at least one of said cover panels is fixedly attached to said support mechanism.

5. The apparatus of claim 2, wherein inside walls of said cover panels include a smooth material.

6. The apparatus of claim 1, wherein said shells further comprise at least first, second and third shells arranged to collapse onto one another.

7. An apparatus for encasing a support mechanism of a patient table having a base and a patient support surface that is movable in at least one of a vertical direction and a tiltable direction, said apparatus comprising:

the support mechanism, connected to the base and the patient support surface; and a telescopic cover mounted to said support mechanism and configured with shells that expand and contract with the movement of said support mechanism, wherein said telescopic cover further comprises at least first and second shells, said first shell including a shelf around an upper interior edge thereof, said shelf being mounted to said support mechanism to move said first shell with movement of said support mechanism; and means for interconnecting said at least first and second shells, said interconnecting means raising said second shell as said first shell is raised and permitting said at least first and second shells to collapse upon one another when lowered.

8. An apparatus for encasing a support mechanism of a patient table having a base and a patient support surface that is movable in at least one of a vertical direction and a tiltable direction, said apparatus comprising:

the support mechanism, connected to the base and the patient support surface;

a telescopic cover mounted to said support mechanism and configured with shells that expand and contract with the movement of said support mechanism;

a stop limit mounted to each shell;

a linkage assembly interconnected between said shells and engaging stop limits, said linkage assembly being lifted by a first shell and lifting a second shell when said linkage assembly engages said stop limits.

9. The apparatus of claim 8, wherein said support mechanism is an adjustable mechanism.

10. The apparatus of claim 8, wherein said shells further comprise rigid cover panels that overlap one another.

11. The apparatus of claim 10, wherein said telescopic rods further comprise means for inducing a negative force on the cover panels.

12. The apparatus of claims 10, wherein at least one of said cover panels is fixedly attached to said support mechanism.

13. The apparatus of claim 8, wherein said linkage assembly includes telescopic rods.

14. The apparatus of claim 10, wherein inside walls of said cover panels include a smooth material.

* * * * *